United States Patent Office 2,985,710
Patented May 23, 1961

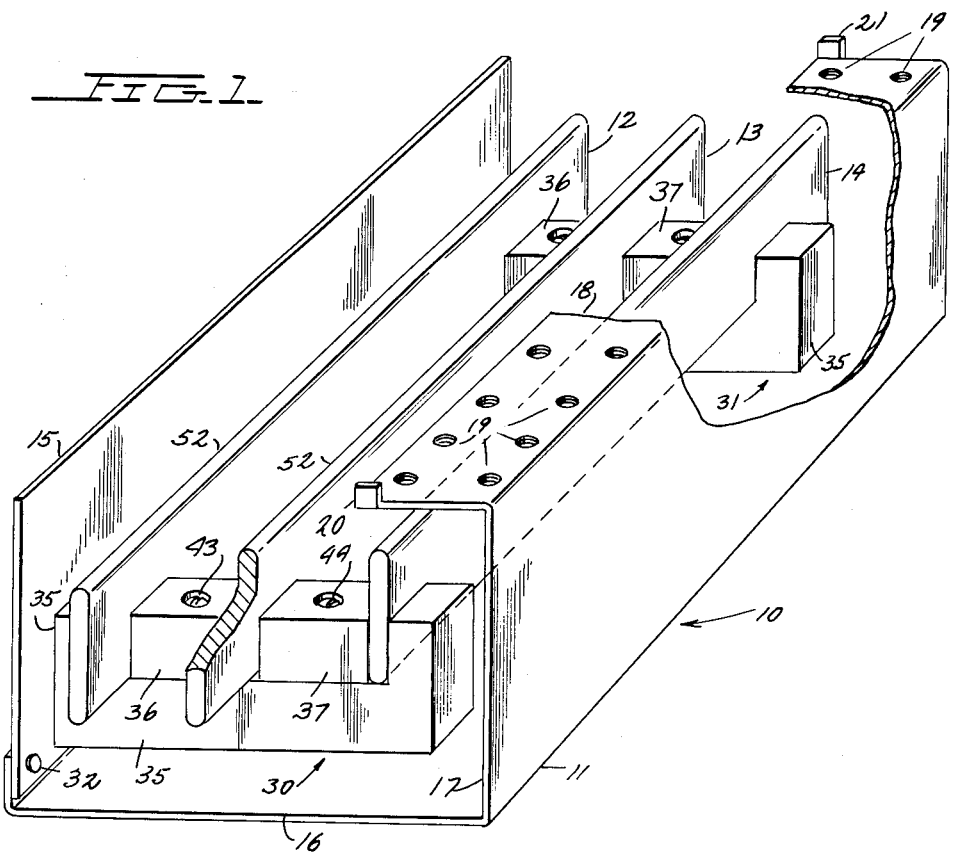

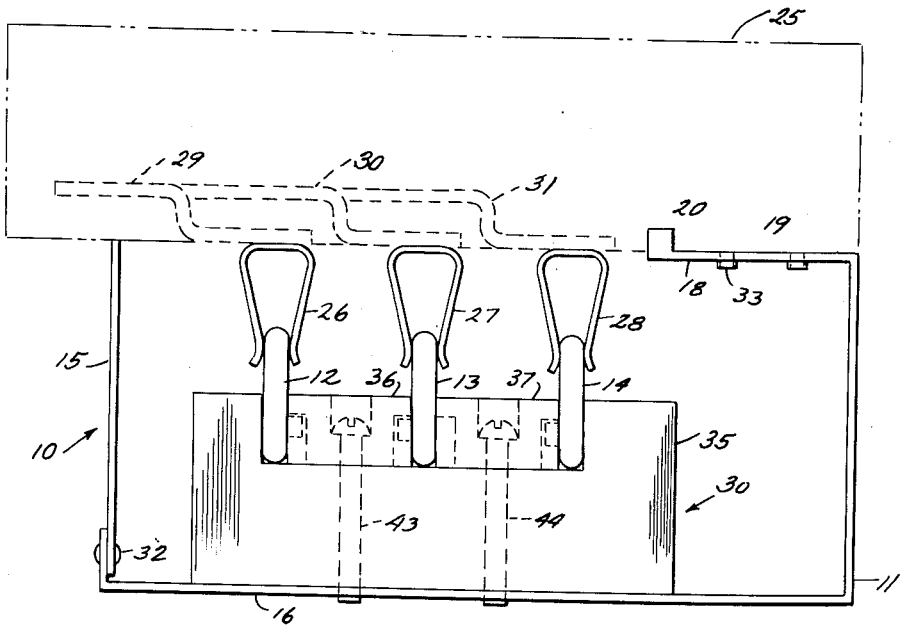
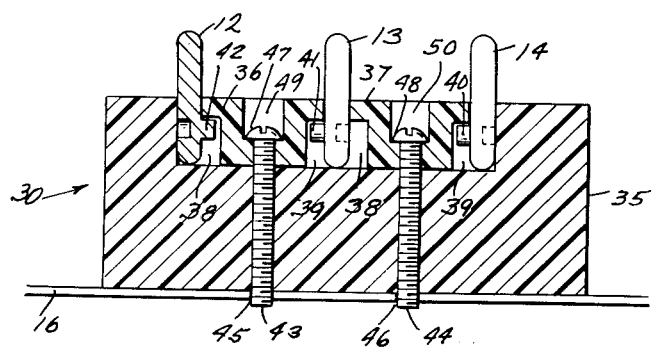

2,985,710

MEANS FOR EDGEWISE MOUNTING OF BUS BARS

Russell S. Davis and Darwin H. Crall, Detroit, Mich., assignors to I-T-E Circuit Breaker Company, Philadelphia, Pa., a corporation of Pennsylvania Filed Apr. 4, 1958, Ser. No. 726,404

13 Claims. (Cl. 174—99)

This invention relates to panelboards in general and more particularly to novel means for securing the bus bars of the panelboard in edgewise relationship with the same means being adapted to support bus bars of different heights.

A primary design consideration in panelboard construction is an efficient arrangement for attaching molded case circuit breakers to the main bus bars of the panelboard. Highly desirable features of the arrangement include the elimination of blind connections between the bus bars and circuit breaker as well as the elimination of the necessity for using tools in making these connections. The arrangement should provide a connection without the necessity of drilling and tapping the main bus bars and the arrangement should permit a circuit breaker to be installed at any location of the panelboard assembly.

Our novel panelboard assembly achieves all of the aforesaid features by providing edgewise mounted bus bars which are engageable by spring reinforced fingers extending downwardly from the circuit breaker line terminals. The edgewise mounted bus bars are maintained in parallel spaced relationship by means of an insulating bottom block and one or more hold-down blocks, with the number of hold-down blocks being equal in number to the bus bars minus one with a minimum of one.

The bus bars are provided with extruded pins extending from one side thereof which are received by pockets in the hold-down blocks which surround the pins on three sides. Screws passing through the hold-down blocks and bottom block are received by threaded apertures in the panelboard mounting plate thereby fastening the blocks to the mounting plate.

A bottom block, hold-down blocks combination is located near each end of the mounting plate. The bottom blocks insulate the bus bars from the mounting plate at the points of securement while between these points the bus bars are suspended above the mounting plate. The hold-down blocks establish the spacing between adjacent bus bars and fasten the bus bars to the bottom blocks in a manner such that both lateral and axial movement is prevented.

The same size notched hold-down blocks will serve as a securing means for bus bars of various heights, the only requirement being that the extruded pins of the bus bars be located the correct distance from the bottom edge of the bus bar. This construction enables power to be tapped from the bus bars even at their points of securement.

Accordingly, a primary object of the instant invention is to provide a panelboard having novel securing means for the bus bars thereof.

Another object is to provide a novel securing means which does not require drilling of the bus bars and permits circuit breaker connections at the points of securement.

Still another object is to provide a novel securing means which will accommodate bus bars of various heights.

A further object is to provide a novel panel-board in which edgewise mounted bus bars are suspended above the mounting plate.

A still further object is to provide a novel securing means comprising hold-down blocks having pockets which surround extruded pins extending from the sides of the bus bars.

These as well as other objects of the instant invention shall become readily apparent after reading the following description of the accompanying drawings in which:

Figure 1 is a perspective view of a panelboard constructed in accordance with the instant invention.

Figure 2 is an end view of the panelboard of Figure 1.

Figure 3 is a fragmentary lateral cross-section of the panelboard of Figure 1 taken with the section being taken through one of the bus bar securing means.

Figure 4 is an exploded view illustrating the hold-down blocks and extruded pins of the bus bars.

Referring to the figures, panelboard assembly 10 comprises an enclosure 11 and three parallel spaced bus bars 12–14 positioned therein. Enclosure 11 includes an insulating side wall 15 and another member comprising a mounting plate 16, a side wall 17 parallel to side wall 15, and a mounting ledge 18 extending inwardly toward the bus bars 12–14. Rivets 32 secure side wall 15 to the other enclosure member. Mounting ledge 18 is provided with a double row of tapped apertures 19 so that panelboard assembly 10 may accommodate circuit breakers of more than a single frame size. Upwardly turned ears 20, 21 at each end of mounting ledge 18 define the longitudinal limits of panelboard assembly 10 between which circuit breakers may be mounted.

As best seen in Figure 2, molded case circuit breaker 25, of a conventional type, is mounted to panelboard assembly 10 by extending across the gap between mounting ledge 18 and insulating side walls 15 with reinforced spring fingers 26–28 being in engagement with bus bars 12–14, respectively. Spring fingers 26–28 are secured to Z-shaped straps 29–31, respectively, which extend downwardly from the line terminals (not shown) of circuit breaker 25. In mounting circuit breaker 25 to panelboard assembly 10 the operator must merely locate spring fingers 26–28 in alignment with bus bars 12–14 respectively, lower circuit breaker 25 so that it rests upon mounting ledge 18 and side wall 15, and thereafter insert mounting screws 33 through circuit breaker 25 into threaded apertures 19. Thus it is seen that the electrical connection between circuit breaker 25 and panelboard assembly 10 is accomplished without the necessity of special tools and without the necessity of drilling holes in the bus bars 12–14. Bus bars 12–14 are supported near each end of enclosure 11 by identical securing means 30, 31 and between securing means 30, 31 bus bars 12–14 are suspended above the mounting plate 16. Securing means 30 and 31 maintain bus bars 12–14 in edgewise relationship and also prevent longitudinal as well as lateral movement thereof as will be hereinafter explained. Since both securing means 30, 31 are identical only one shall be described.

Securing means 30 comprises an insulating U-shaped bottom block 35 and two insulating hold-down blocks 36 and 37. Each of the hold-down blocks 36, 37 are provided with pockets 38, 39 on opposite surfaces thereof. It is to be noted that pockets 38, 39 each communicate with two adjacent surfaces of hold-down blocks 36, 37. Pocket 39 of hold-down block 37 receives extruded pin 40 which projects outwardly from the side wall of bus bar 14. Similarly, pocket 39 of hold-down block 36 receives extruded pin 41 of bus bar 13 and pocket 38 of hold-down block 36 receives extruded pin 42 of bus bar 12. In the three conductor arrangement illustrated, pocket 38 of hold-down block 37 remains empty.

Screws 43 and 44 extend through clearance holes in hold-down blocks 36, 37 respectively as well as clearance holes in bottom block 35 and are received by threaded apertures 45, 46 respectively in mounting plate 16. The heads 47, 48 of screws 43, 44 are disposed within recesses 49, 50 of hold-down blocks 36, 37 respectively.

The lateral spacing between bus bars 12–14 is maintained by the width of hold-down blocks 36, 37 and downward movement of bus bars 12–14 is prevented by bottom block 35. When extruded pins 40–42 are engaged on three sides by the walls forming pockets 38, 39 of hold-down blocks 36, 37, and these blocks are secured to bottom block 35, upward as well as longitudinal movement of bus bars 12–14 is prevented. Thus securing means 30 not only positions bus bars 12–14 in edgewise spaced parallel relationship but also prevents longitudinal and lateral movement of these bus bars.

When the current rating of panelboard assembly 10 is to be increased, bus bars of a greater height than height B of bus bars 12–14 may be secured to mounting plate 16 by the same securing means 30, 31 the only requirement being that the distance between the bottom edge 51 of the large size bus bars and the extruded pins thereof be equal to this distance A of bus bars 12–14.

The novel bus bar securing means hereinbefore described makes it possible to tap electrical energy from bus bars 12–14 at any point along their lengths. That is, the top edges 52 of bus bars 12–14 are exposed for their entire lengths. Further the side walls of bus bars 12–14 are accessible for their entire lengths from the top edges 52 down to the tops of hold-down blocks 36, 37 which is a substantial amount of the height of bus bars 12–14.

Although we have here described preferred embodiment of our novel invention, many variations and modifications will now be apparent to those skilled in the art, and we therefore prefer to be limited, not by the specific disclosure herein, but only by the appending claims.

We claim:

1. A panelboard assembly comprising a mounting plate, a plurality of spaced parallel bus bars, and a securing means; said securing means being fastened to said mounting plate; said securing means positioning said bus bars with respect to said mounting plate in a manner such that said bus bars are suspended above said mounting plate for a substantial portion of their lengths; said securing means maintaining the spacing between bus bars; said securing means including a bottom block and at least one insulating hold-down means having pockets formed therein; said bus bars having pin means projecting therefrom and positioned within said pockets thereby preventing lateral and longitudinal movement of said bus bars.

2. A panelboard assembly comprising a mounting plate, a plurality of spaced parallel bus bars, and a securing means; said securing means being fastened to said mounting plate; said securing means positioning said bus bars with respect to said mounting plate in a manner such that said bus bars are suspended above said mounting plate for a substantial portion of their lengths; said securing means maintaining the spacing between bus bars; said securing means including a bottom block and at least one insulating hold-down means having pockets formed therein; said bus bars having pin means projecting therefrom and positioned within said pockets thereby preventing lateral and longitudinal movement of said bus bars; said securing means being constructed to permit the tapping of electrical power from said bus bars at their points of securement.

3. A panelboard assembly comprising a mounting plate, a plurality of spaced parallel bus bars, and a securing means; said securing means being fastened to said mounting plate; said securing means positioning said bus bars with respect to said mounting plate in a manner such that said bus bars are suspended above said mounting plate for a substantial portion of their lengths; said securing means maintaining the spacing between bus bars; said securing means including a bottom block and at least one insulating hold-down means having pockets formed therein; said bus bars having pin means projecting therefrom and positioned within said pockets thereby preventing lateral and longitudinal movement of said bus bars; said securing means being constructed to permit the tapping of electrical power from said bus bars at their points of securement; said bottom block being generally U-shaped; said hold-down means and said bus bars being entirely disposed between the arms of said bottom block.

4. A panelboard assembly comprising a mounting plate, a plurality of spaced parallel bus bars, and a securing means; said securing means being fastened to said mounting plate; said securing means positioning said bus bars with respect to said mounting plate in a manner such that said bus bars are suspended above said mounting plate for a substantial portion of their lengths; said securing means maintaining the spacing between bus bars; said securing means including a bottom block and at least one insulating hold-down means having pockets formed therein; said bus bars having pin means projecting therefrom and positioned within said pockets thereby preventing lateral and longitudinal movement of said bus bars; said securing means being constructed to permit the tapping of electrical power from said bus bars at their points of securement; said bottom block being generally U-shaped; said hold-down means and said bus bars being disposed between the arms of said bottom block; said hold-down means comprising a first block having a first of said pockets; said pocket communicating with two adjacent surfaces of said first block.

5. A panelboard assembly comprising a mounting plate, a plurality of spaced parallel bus bars, and a securing means; said securing means being fastened to said mounting plate; said securing means positioning said bus bars with respect to said mounting plate in a manner such that said bus bars are suspended above said mounting plate for a substantial portion of their lengths; said securing means maintaining the spacing between bus bars; said securing means including a bottom block and at least one insulating hold-down means having pockets formed therein; said bus bars having pin means projecting therefrom and positioned within said pockets thereby preventing lateral and longitudinal movement of said bus bars; said securing means being constructed to permit the tapping of electrical power from said bus bars at their points of securement; said bottom block being generally U-shaped; said hold-down means and said bus bars being disposed between the arms of said bottom block; said hold-down means comprising a first block having a first of said pockets; said pocket communicating with two adjacent surfaces of said first block; said plurality of bus bars comprising members having generally rectangular cross-sections; said members being positioned in edgewise relationship.

6. The combination comprising a first, a second, and a third elongated rectangular bus bar, and an insulating securing means for maintaining said bus bars in parallel, edgewise, spaced apart relationship; each of said bus bars including pin means extending from a side wall thereof; said securing means including pockets wherein said pin means are disposed; said securing means engaging said bus bars in a manner such that a longitudinal edge thereof is accessible for its entire length and a substantial portion of the side walls adjacent to said edge are also accessible for their entire lengths.

7. The combination comprising a first, a second, and a third elongated bus bar of rectangular cross-section, and an insulating securing means for maintaining said bus bars in parallel, edgewise, spaced apart relationship; each of said bus bars including pin means extending from a side wall thereof; said securing means including pockets wherein said pin means are disposed; said securing means engaging said bus bars in a manner such that a longitudinal edge thereof is accessible for its entire length and a substantial portion of the side walls adjacent to said edge are also accessible for their entire lengths; said securing means comprising a U-shaped block, a first and a second hold-down block; said first and second hold-down blocks being removably secured to said U-shaped block; said first bus bar being positioned adjacent to one leg of said U-shaped block and said third bus bar being positioned to the other leg of said U-shaped block; said first hold-down block being positioned between said first and said bus bars; said second hold-down block being positioned between said second and said third bus bars; each of said first and said second blocks having a first and a second of said pockets formed therein.

8. The combination comprising a first, a second, and a third elongated bus bar of rectangular cross-section, and an insulating securing means for maintaining said bus bars in parallel, edgewise, spaced apart relationship; each of said bus bars including pin means extending from a side wall thereof; said securing means including pockets wherein said pin means are disposed; said securing means engaging said bus bars in a manner such that a longitudinal edge thereof is accessible for its entire length and a substantial portion of the side walls adjacent to said edge are also accessible for their entire lengths; said securing means comprising a U-shaped block, a first and a second hold-down block; said first and second hold-down blocks being removably secured to said U-shaped block; said first bus bar being positioned adjacent to one leg of said U-shaped block and said third bus bar being positioned to the other leg of said U-shaped block; said first hold-down block being positioned between said first and said bus bars with a first surface of said first hold-down block facing a second surface of said U-shaped block; said second hold-down block being positioned between said second and said third bus bars with a first of said second hold-down block facing said second surface of said U-shaped block; said hold-down blocks having a first and a second of said pockets cut therein; each of said pockets communicating with said first and a second surface of its associated hold-down block; said first and said second surfaces being adjacent to one another.

9. A panelboard assembly comprising a mounting plate, a plurality of spaced parallel bus bars, and a securing means; said securing means being fastened to said mounting plate; said securing means positioning said bus bars with respect to said mounting plate in a manner such that said bus bars are suspended above said mounting plate for a substantial portion of their lengths; said securing means maintaining the spacing between bus bars; said securing means including a bottom block and at least one insulating hold-down means having pockets formed therein; said bus bars having pin means projecting therefrom and positioned within said pockets thereby preventing lateral and longitudinal movement of said bus bars; a first edge of each of said bus bars abutting said bottom block; said hold-down means being entirely positioned between said bus bar first edges and a second edge of each of said bus bars.

10. A bus bar securing means comprising a first block and a second block removably secured to said first block; said second block having two elongated pockets cut in opposite parallel surfaces thereof; each of said pockets having one of their ends communicating with a first surface connecting said opposite surfaces with the other end of each pocket being closed; said first surface being perpendicular to the longitudinal axes of said pocket; said first block including an integrally formed portion having a surface extending generally parallel to said parallel surfaces; said surface of said integrally formed portion confronting one of said pockets and being spaced from the surface containing the one of said pockets to form a space adapted to receive a bus bar.

11. The bus bar securing means as set forth in claim 10 in which the one of the pocket ends are positioned adjacent to the first block.

12. The bus bar securing means as set forth in claim 11 in which the first block comprises a U-shaped member in which the integrally formed portion is one of the arms of the U; said second block being entirely positioned between the arms of said member.

13. An assembly comprising a plurality of spaced parallel elongated bus bars, a securing means for said bus bars, and means for mounting said securing means relative to a surface; said securing means positioning said bus bars with respect to said mounting plate in a manner such that said bus bars are suspended above said surface for a substantial portion of their lengths; said securing means maintaining the spacing between bus bars; said securing means including a bottom block and at least one insulating hold-down means having pockets formed therein; said bus bars having pin means projecting therefrom and positioned within said pockets thereby preventing lateral and longitudinal movement of said bus bars.

References Cited in the file of this patent

UNITED STATES PATENTS

| 1,677,764 | Gloekler | July 17, 1928 |
| 2,216,870 | Adam | Oct. 8, 1940 |
| 2,443,371 | Barner | June 15, 1948 |
| 2,445,463 | West | July 20, 1948 |
| 2,473,264 | Stevens et al. | June 14, 1949 |
| 2,681,392 | Herrmann | June 15, 1954 |

FOREIGN PATENTS

| 849,256 | Germany | Sept. 11, 1952 |